US007516408B2

(12) United States Patent
Kumhyr et al.

(10) Patent No.: US 7,516,408 B2
(45) Date of Patent: Apr. 7, 2009

(54) METHOD, SYSTEM AND PROGRAM FOR SWITCHING BETWEEN VARIOUS COMPUTER-BASED COMMUNICATION TECHNIQUES

(75) Inventors: David B. Kumhyr, Austin, TX (US); Margaret Gardner MacPhail, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1405 days.

(21) Appl. No.: 09/966,829

(22) Filed: Sep. 28, 2001

(65) Prior Publication Data

US 2003/0065666 A1     Apr. 3, 2003

(51) Int. Cl.
*G06F 17/00* (2006.01)

(52) U.S. Cl. .................. 715/751; 715/738; 715/744; 707/9; 707/102; 707/104.1; 709/204

(58) Field of Classification Search ............ 707/1–10, 707/100–104.1, 200–206; 709/224–226, 709/227, 228, 220–221, 204; 715/516, 700, 715/748, 738–744, 750–759; 345/650, 661, 345/762
See application file for complete search history.

(56) References Cited

U.S. PATENT DOCUMENTS

| 5,606,702 | A |   | 2/1997  | Diel et al. ............ 709/329 |
| 5,801,700 | A | * | 9/1998  | Ferguson ............. 715/748 |
| 5,815,142 | A |   | 9/1998  | Allard et al. ......... 345/173 |
| 5,859,639 | A | * | 1/1999  | Ebrahim .............. 345/788 |
| 5,862,325 | A | * | 1/1999  | Reed et al. ........... 709/201 |
| 5,862,330 | A |   | 1/1999  | Anupam et al. |
| 5,887,136 | A | * | 3/1999  | Yasuda et al. ........ 709/204 |
| 5,903,754 | A |   | 5/1999  | Pearson |
| 5,937,163 | A | * | 8/1999  | Lee et al. ............ 709/218 |
| 5,987,376 | A |   | 11/1999 | Olson et al. |
| 6,154,465 | A |   | 11/2000 | Pickett .............. 370/466 |
| 6,167,366 | A |   | 12/2000 | Johnson ................ 704/2 |
| 6,212,548 | B1 |  | 4/2001  | DeSimone et al. ...... 709/204 |
| 6,230,186 | B1 |  | 5/2001  | Yaker |
| 6,266,701 | B1 |  | 7/2001  | Sridhar et al. ........ 709/232 |

(Continued)

OTHER PUBLICATIONS

Theo van Walsum et al., Feature Extraction and Iconic Visualization, Apr. 21-24, 1996, IEEE, 111-119.*

(Continued)

*Primary Examiner*—Jean Bolte Fleurantin
(74) *Attorney, Agent, or Firm*—Kevin L. Daffer; Daffer McDaniel, LLP; Justin Dillon, IBM

(57) ABSTRACT

In an embodiment of a method of establishing a computer-based communication session involving a user of a computer, notification may be received from the user of a desired participant and a desired communications application for the session. A participant identifier effective to identify the desired participant to the desired communications application may then be retrieved, and the retrieved identifier may be provided to the communications application. An embodiment of a system for computer-based communications includes means for receiving notification of a desired participant in a communications session and a desired communications application for the session, means for retrieving a participant identifier appropriate to identify the desired participant to the desired communications application, and means for providing the retrieved participant identifier to the communications application. The means for receiving notification, means for retrieving a participant identifier and means for providing the identifier may include a communications aggregation program.

16 Claims, 10 Drawing Sheets

U.S. PATENT DOCUMENTS

| | | | |
|---|---|---|---|
| 6,304,973 | B1 | 10/2001 | Williams |
| 6,314,425 | B1 * | 11/2001 | Serbinis et al. ............... 707/10 |
| 6,522,333 | B1 | 2/2003 | Hatlelid et al. |
| 6,549,937 | B1 | 4/2003 | Auerbach et al. |
| 6,584,466 | B1 * | 6/2003 | Serbinis et al. ............... 707/10 |
| 6,584,493 | B1 | 6/2003 | Butler |
| 6,678,719 | B1 * | 1/2004 | Stimmel .................... 709/204 |
| 6,748,420 | B1 | 6/2004 | Quatrano et al. |
| 6,836,792 | B1 | 12/2004 | Chen |
| 6,842,772 | B1 | 1/2005 | Delaney et al. |
| 2002/0083134 | A1 | 6/2002 | Bauer, Jr. et al. |
| 2002/0143877 | A1 | 10/2002 | Hackbarth et al. |
| 2003/0014491 | A1 | 1/2003 | Horvitz et al. |
| 2003/0055844 | A1 | 3/2003 | Rudd et al. |
| 2003/0063121 | A1 | 4/2003 | Kumhyr et al. |
| 2003/0065666 | A1 | 4/2003 | Kumhyr et al. |
| 2003/0065723 | A1 | 4/2003 | Kumhyr et al. |
| 2003/0065955 | A1 | 4/2003 | Kumhyr et al. |
| 2004/0249776 | A1 | 12/2004 | Horvitz et al. |
| 2005/0188111 | A1 | 8/2005 | Armstrong et al. |
| 2005/0197111 | A1 | 9/2005 | Alanara et al. |

OTHER PUBLICATIONS

Abramowski, S. et al., Multimedia session management, 1996, IEEE, 8-12.*

Foley, "IBM advances Web services strategy," Mar. 2001, pp. 1-3.

Olsen, "Privacy terms revised for Microsoft Passport," Apr. 2001, pp. 1-3.

Wilcox, "With HailStorm, think fee, not free," Mar. 2001, pp. 1-4.

Wilcox, "Microsoft's HailStorm unleashed," Mar. 2001, pp. 1-4.

"Passport Q&A for Businesses," ©1999-2001 Microsoft Corporation, pp. 1-11.

Gibson, "The Strange Tale of the Attacks Against GRC.com," Jun. 2001, pp. 1-28.

Young, "Debugging TCP/IP," Sep. 2000, pp. 1-6.

Braden, "Time-Wait Assassination Hazards in TCP," May 1992, pp. 1-8.

Faber et al., "Avoiding the TCP Time_Wait state at Busy Service," Aug. 1997, pp. 1-13.

IBM Corporation, "Using the Applications Management Specification in a TMA Environment," Jun. 1997, pp. 1-6.

Office Action mailed Jan. 11, 2006 for U.S. Appl. No. 09/966,516.

Office Action mailed Jul. 12, 2005 for U.S. Appl. No. 09/966,516.

Office Action mailed May 19, 2005 for U.S. Appl. No. 09/966,833.

Office Action mailed Nov. 4, 2004 for U.S. Appl. No. 09/966,833.

Office Action mailed Dec. 1, 2005 for U.S. Appl. No. 09/967,219.

Office Action mailed Jun. 3, 2005 for U.S. Appl. No. 09/967,219.

Office Action mailed Nov. 10, 2004 for U.S. Appl. No. 09/967,219.

* cited by examiner

| Attribute | Value |
|---|---|
| Actual Name | John Doe |
| Id for Email | jdoe@mailserver.com |
| Available for Email? | Yes |
| Id for Instant Messaging | johndoe1234 |
| Available for Instant Messaging? | No |
| Permission Level | 3 |
| Role Code | 2 |

*Fig. 3*

| Active Conversations 56 | | |
|---|---|---|
| Application | Status | User ID |
| Email program | Running | jdoe@mailserver.com |
| Instant message prog. | Running | johndoe1234 |

Fig. 5

METHOD, SYSTEM AND PROGRAM FOR SWITCHING BETWEEN VARIOUS COMPUTER-BASED COMMUNICATION TECHNIQUES

RELATED APPLICATIONS

This application is related to the following copending U.S. Patent Applications, filed on even date herewith: "Selection and Interconnection of Computer-Based Communications Techniques" by Kumhyr and MacPhail, "Computer-Based Communication Using Multiple Communications Channels" by Kumhyr and MacPhail, and "Determining Availability of Participants or Techniques for Computer-Based Communication" by Kumhyr and MacPhail.

BACKGROUND OF THE INVENTION

1. Field of the Invention

This invention relates to computer-based communication, and more particularly to a method, system and program for switching communication techniques during the course of a communications session.

2. Description of the Related Art

The following descriptions and examples are not admitted to be prior art by virtue of their inclusion within this section.

The continuing proliferation of powerful, convenient computational devices has been accompanied by an increase in the use of networks connecting these devices. Computational devices include computers and other, often portable, devices such as wireless telephones, personal digital assistants (PDA's), automobile-based computers and appliance-based computers. Such computational devices are also sometimes termed "pervasive devices." "Computer," as used herein, may refer to any of such computational devices. The networks connecting computational devices may be "wired" networks, formed using "land lines" such as copper wire or fiber optic cable, wireless networks employing earth and/or satellite-based wireless transmission links, or combinations of wired and wireless network portions. Networked computational devices are increasingly configured with the ability to interact and communicate with one another. For example, electronic mail may currently be sent to some wireless telephones and pagers, and PDA's may be used to access some Internet and World Wide Web (or "web") sites.

The many available techniques for computer-based communication exhibit a range of values for criteria such as immediacy of communication, security, and bandwidth required. Email, for example, is analogous to a letter or memo, with a low degree of immediacy, relatively low bandwidth requirement, and potentially high security. AnIP (Internet Protocol) conference, or meeting held over the Internet using cameras, by contrast, has high immediacy, high bandwidth requirements, and potentially lower security (since encryption measures may detract from the ability to provide real-time communication). Other computer-based communication techniques (also referred to herein as "communications applications"), such as instant messaging, message boards, internet chat, and IP telephone, can be described using similar criteria.

This wide array of communication options can cause inconvenience and difficulty for user's in some cases. For example, it may be difficult to determine the best communications application to use for initiating communications with a particular person. This may occur when the availability of that person using various communications applications is not known. "Availability" as used herein may refer to the availability of a person (e.g., is the person logged onto his computer), the availability of equipment (such as a web camera), and/or the availability of needed software. In other words, availability may encompass numerous circumstances that might limit the ability to contact a person by a particular communications technique. Furthermore, the identifier of the person within a desired communications application, commonly called a "user id", may not be known by the person wishing to initiate communication. Before a communication session can be initiated, therefore, a "pre-conversation" by telephone or some other method may be needed in order to ascertain availability and/or obtain the person's identifier. Such additional conversations can greatly increase the time and effort expended in carrying out computer-based communication, particularly when more that two people are involved in the communication.

Even when a communications session is initiated using a desired communications application, it may be realized during the course of the conversation that another form of communication would be more convenient. This could happen if the nature of the conversation changes, or if it simply becomes clear that the best communications application wasn't used from the beginning. Changing to another communications application can be rather inconvenient, however. Each participant may have to open up another application program, and efforts as described above to verify availability and obtain participant identifiers may need to be carried out. These steps necessitate enough disruption to a flow of conversation that typically changing to another communications application is avoided. Instead, participants may continue to "stretch" the capabilities of a given application. For example, participants may continue to send repeated short email messages back and forth, even though many "mouse clicks" could be saved if a messaging or chat application were used instead.

It would therefore be desirable to develop a way to make it convenient for participants in computer-based communications to select the most appropriate communications application.

SUMMARY OF THE INVENTION

The problems outlined above are in large part addressed by methods, systems and programs implementing what is referred to herein as the Communications Aggregation Technique (CAT). The CAT can bring together (i.e., aggregate) multiple computer-based communications applications, to limit the amount of separate user interaction required with each application. For example, a set of identifiers (user id's) identifying a participant to each communications application may be stored and accessed by a CAT program. Referring to such an identifier set may allow the CAT program to rapidly initiate a communications session using a requested communications application. Availability of a participant using each of the communications applications may further be stored and accessed, freeing participants from having to determine each others' availability on their own. The CAT program may in some cases appear as a user's sole communications application, by accessing one or more communications applications in a way that is invisible to the user. The methods described herein are currently contemplated as being performed by such a CAT program, possibly in combination with a communications application program. The methods are therefore described from the "point of view" of such a program or programs.

An embodiment of a method for configuring computer-based communication includes obtaining respective user identifiers appropriate to identify a user of a computer to each of multiple communications applications accessible with the computer, and providing on a display screen of the computer a graphical user interface (GUI) associated with the computer-based communication, where the graphical user interface includes representations of the multiple communications applications. Ways in which the user identifiers may be obtained include entry by the user and accessing of previously-stored identifiers. As used herein, "user" refers to a person who seeks to initiate a computer-based communications session. "Participants" is generally used herein to refer to other people involved in such a session, though the user is of course a participant also. In an embodiment, the method may further include obtaining user passwords for the communications applications. Alternatively or in addition, availability information indicating the availability of the user for communication using each of the communications applications may be obtained. The graphical user interface provided may take various forms, including that of a window indicating the status of each of the multiple communications, or a set of icons corresponding to the multiple communications applications.

The method described above may further include communicating the obtained user identifiers and/or availability information to an additional computer. Alternatively or in addition, the method may include identifying all of the communications applications accessible with the computer, and determining the status of each of the identified applications. This may include determining the status of each of the communications ports within the computer. In another embodiment, the method described above may include connecting the user to a first one of the communications applications to establish a first session, in response to user selection of the first communications application. The connecting may be done by providing an appropriate one of the obtained user identifiers to the first communications application. The method may further include, in response to instructions from the user, joining the first session to a second session established by connection of the user to a second one of the communications applications.

In an embodiment of a method of establishing a computer-based communication session involving a user of a computer, notification may be received from the user of a desired participant and a desired communications application for the session. A participant identifier effective to identify the desired participant to the desired communications application may then be retrieved, and the retrieved identifier may be provided to the communications application. In an embodiment, the notification may be received by detecting selection of an icon within a graphical user interface displayed using the computer. The method may also include displaying such a graphical user interface. For example, selection of a first displayed icon may be detected, along with movement of the first icon to the position of a second displayed icon. Entities which may be represented by such first or second icons include, for example, the desired participant (or group of desired participants), the desired communications application, and a previously-established communications session. In another embodiment, receiving of the notification from the user may include receiving permission or role information indicating requirements for the potential participant. Retrieving of the participant identifier may include accessing a data structure storing the identifier. In some embodiments, the method may further include retrieving a user identifier appropriate to identify the user to the desired communications application, and/or retrieving a password effective to allow access of the user to the desired communications application.

Another embodiment of a method of establishing a computer-based communications session involving a user of a computer may include determining the availability of a potential participant in the communications session. According to the determined availability, information may be displayed on a display screen of the computer. In an embodiment, determining availability may include retrieving availability information for the participant from a data structure, which may in some cases be stored on an additional computer. Displaying the information may include displaying availability of a given participant for each of multiple communications applications. Alternatively or in addition, the displaying may include displaying a list of participants available for communication using a given communications application. In an embodiment, the method may further include receiving from the user notification of a desired communications application to be used for the communications session. If the potential participant is available using the desired communications application, such an embodiment may include retrieving a participant identifier effective to identify the participant to the communications application.

In an embodiment of a method of sending a message by computer-based communication, an identification of an intended message recipient is received from the sender of the message, and one or more communications applications to be used for transmission of the message are selected. The selection of the communications applications may include evaluating availability of the intended recipient for communication using each of a set of possible communications applications. The method may further include receiving from the sender a preferred characteristic of the transmission. Such a preferred characteristic could include, for example, a preferred speed of the transmission, a preferred level of security, or a relative size of the message to be sent. In another embodiment, the method may include sending at least a portion of the message using each of the selected communications applications, such that the entirety of the message is sent. In an embodiment for which multiple communications applications are selected, the method may include dividing the message into separate portions appropriate for sending by the respective selected communications applications, prior to sending the message.

In addition to the methods described above, a system for computer-based communications is contemplated herein. In an embodiment, the system may be a computer system including a display screen, means for obtaining user identifiers effective to identify a user of the computer system to each of multiple communications applications accessible with the computer system, and means for providing on the display screen a GUI associated with computer-based communication, where the GUI includes representations of the multiple communications applications. The means for obtaining user identifiers and the means for providing a GUI may include a communications aggregation program stored on a storage medium accessible by the computer system. The system may further include application programs stored on the storage medium, where the application programs correspond to the multiple communications applications. Such application programs may be adapted to receive corresponding user identifiers from the communications aggregation program. The application programs and the communications aggregation program may further adhere to a common application programming interface.

Another embodiment of a system for computer-based communication includes a display screen, means for determining the availability of a potential participant in a computer-based communications session, and means for, according to the determined availability, displaying information on the display screen. The means for determining availability and means for displaying may include a communications aggregation program stored on a storage medium within the system. The storage medium and display screen may or may not be associated with the same computer system. In an embodiment, the communications aggregation program is adapted to access a data structure including participant availability information. The data structure and the communications aggregation program may in some cases be stored on different storage media associated with different computer systems. In another embodiment, the system may further include means for receiving, from an initiator of the communications session, notification of a desired communications application to be used. The system may additionally include means for retrieving a participant identifier effective to identify the participant to the desired communications application, if the potential participant is available using that application.

An additional embodiment of a system for computer-based communications includes means for receiving, from a user of a computer, notification of a desired participant in a communications session and a desired communications application for the session, means for retrieving a participant identifier appropriate to identify the desired participant to the desired communications application, and means for providing the retrieved participant identifier to the communications application. The means for receiving notification, means for retrieving a participant identifier and means for providing the identifier may include a communications aggregation program stored on a storage medium within the system. The storage medium may be, for example, within or accessible by the user's computer, or within or accessible by an additional computer. In an embodiment, the communications aggregation program is adapted to display a GUI on a display screen of the user's computer, where the GUI includes representations of multiple communications applications accessible using the computer, and of multiple potential participants in a communications session. An embodiment of the system may further include means for retrieving a user identifier appropriate to identify the user to the desired communications application.

In another embodiment of a system for computer-based communication, the system includes a computer having a storage medium. The storage medium includes program instructions executable on the computer for receiving, from a sender of the message, an identification of an intended message recipient, and for selecting one or more communications applications to be used for transmission of the message. In an embodiment, the program instructions are within a communications aggregation program. The computer may in some cases include a display device and input device adapted for use by a sender of the message. Alternatively or in addition, the computer may be adapted for coupling over the network to an additional computer used by the sender of the message. In an embodiment, the storage medium further includes program instructions executable for sending at least a portion of the message using each of the selected communications applications, such that the entirety of the message is sent. In such an embodiment, the computer may be adapted for coupling over the network to an additional computer used by the recipient of the message.

In addition to the methods and systems described above, a computer-usable carrier medium is contemplated herein. The carrier medium may be a storage medium, such as a magnetic or optical disk, a magnetic tape, or a memory. In addition, the carrier medium may be a transmission medium, such as a wire, cable, or wireless medium along which data or program instructions are transmitted, or a signal carrying the data or program instructions along such a wire, cable or wireless medium. The carrier medium may contain program instructions executable for carrying out embodiments of the methods described herein. Alternatively or in addition, the carrier medium may contain program instructions executable to implement a communications application, such that the program instructions are adapted to interact with a CAT program (such an application may be referred to herein as "CAT-enabled"). In an embodiment, such program instructions may implement a wrapper or shell program enabling a third-party communications application program to interact with the CAT program.

Alternatively or in addition to the program instructions described above, the carrier medium may contain a data structure used in implementing the methods. The data structure may store, for example, a set of user identifiers effective to identify a user of a computer to each of multiple communications applications accessible with the computer. Alternatively or in addition, a data structure may store multiple sets of participant identifiers, each identifier effective to identify a potential participant in a computer-based communications session to each of such multiple communications applications. Role or permission information corresponding to each potential participant could also be stored in a data structure. In another embodiment, a data structure could store information indicating availability of a potential participant with respect to each of multiple communications applications.

BRIEF DESCRIPTION OF THE DRAWINGS

Other objects and advantages of the invention will become apparent upon reading the following detailed description and upon reference to the accompanying drawings in which:

FIG. 3 illustrates exemplary information to be included in an identifier set for a participant in computer-based communication;

FIG. 5 illustrates an exemplary window showing information regarding active computer-based conversations;

Figure 1:
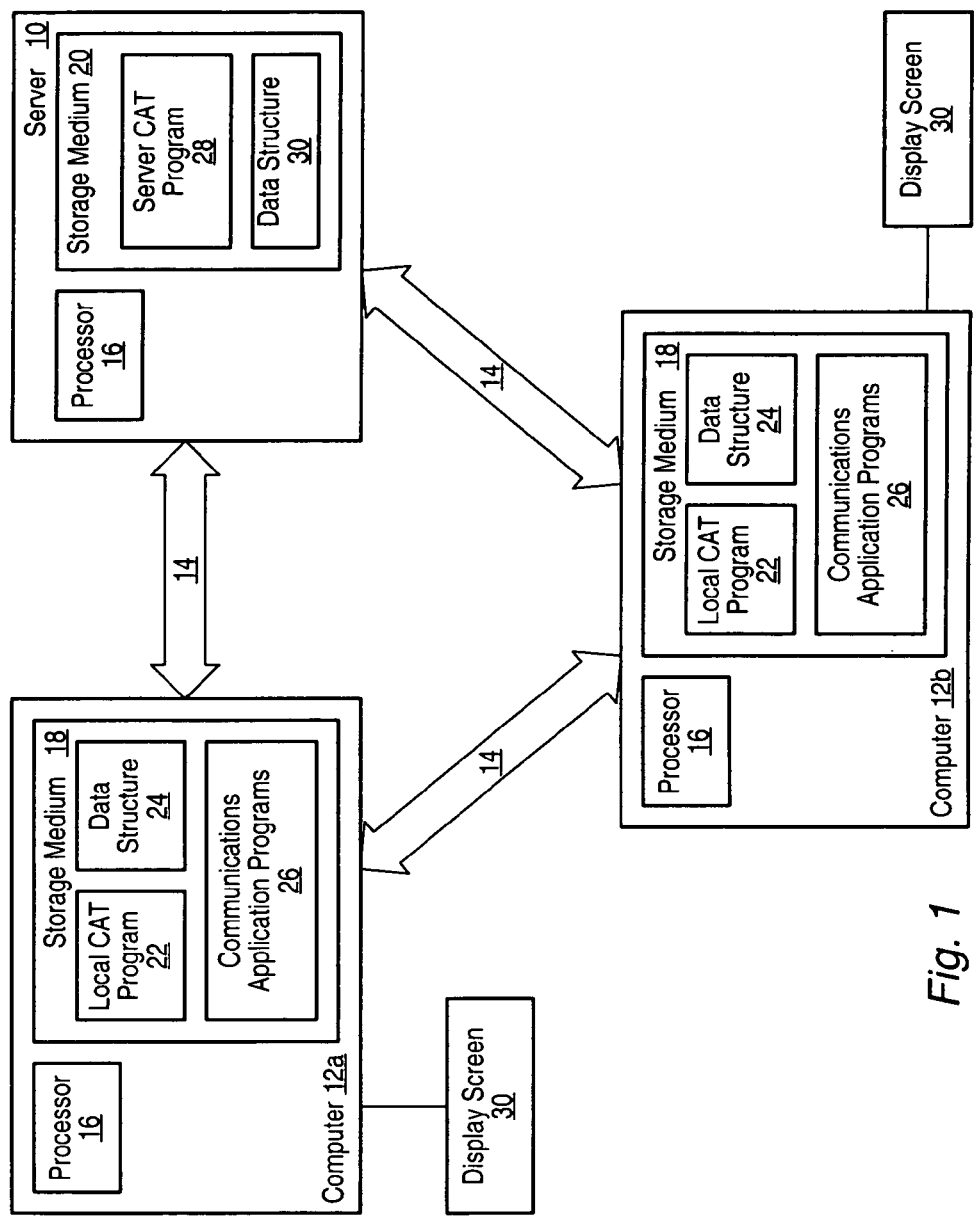
FIG. 1 is a block diagram illustrating an embodiment of a server-based system for computer-based communication.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

A block diagram illustrating an exemplary embodiment of a system which may be used to implement the methods described herein is shown in FIG. 1. Server computer 10 is connected to computers 12a and 12b through transmission media 14. Transmission medium 14 is representative of connections between networked computers, and may include, for example, a wire, cable, wireless transmission path, or a combination of these. Connection 14 may further involve other computers or network devices such as hubs or routers. Each of the computers in FIG. 1 may be connected to many other computers not shown, through a network such as the Internet. The arrangement of FIG. 1 can be viewed as a client/server arrangement. Many networks are organized using such a client/server architecture, in which "server" computational devices manage resources, such as files, peripheral devices or processing power, which may be requested by "client" computational devices. In the case of FIG. 1, resources managed by server 10 for clients 12a and 12b may include identifier and availability information for participants in computer-based communication. Each of the computers typically includes a processor 16. Although there are many variations in processor architecture, and the processors in computers 10, 12a and 12b need not be identical, any differences are not important with respect to the systems and methods described herein. Processor 16 needs only to have sufficient capability to perform the various functions described herein of the corresponding computer.

Computers 12a and 12b also include a storage medium 18, and server 10 includes storage medium 20. Storage media 18 and 20 may each take many forms, such as volatile or non-volatile memory, a magnetic disk such as a hard drive or floppy drive, an optical disk, and/or a magnetic tape. Further, each storage medium described may be implemented as a combination of multiple of these physical forms. In the embodiment of FIG. 1, items stored on storage medium 18 include local CAT program 22, data structure 24, and communications application programs 26. Program instructions such as those in programs 22 and 26 may be stored as "executable files" in a direct access storage device such as a disk and loaded into memory during execution.

Local CAT program 22 is a version of the communications aggregation program described herein which may be used in a client/server configuration such as that of FIG. 1. Functions performed by this program may include providing a CAT "console" through which a user of the computer (e.g., 12a or 12b) may view the status of any active "conversations" (i.e., communications sessions) that the user is engaged in. The console may also show the availability of other communications applications which are not necessarily currently active. Local CAT program 22 may implement the initial configuration of the console, through actions including identifying any CAT-enabled applications among communications applications 26, and prompting the user to enter user identifiers (id's) and/or passwords for these applications. Program 22 may also pass the set of id's for the user to server CAT program 28 on server 10, and receive id sets of other users from program 28. Further, program 22 may interact with a communications application program from programs 26. Such interaction could include sending the appropriate user identifier, and possibly the appropriate password, to the application program in the course of beginning a communications session.

Various information collected by and/or used by program 22 may be stored in data structure 24. As used herein, "data structure" refers to a collection of interrelated data stored in a storage medium, and may include pieces of data and the relationships between them. A data structure may take any of multiple forms, such as a database, an object or class in an object-based programming approach, or some other form such as a look-up table. The information within data structure 22 may include, for example, a set of identifiers appropriate to identify a computer user to each of the CAT-enabled communications applications. Information on availability of the user for communication via the various applications may also be included, as may the user's passwords used in gaining access to the communications applications. In some embodiments, identifier and availability information for participants other than the user may be stored in data structure 24, or in a different data structure within the computer. Such information may be obtained through, for example, interaction between local CAT program 22 and server CAT program 28.

Storage medium 18 may also contain communications applications 26. These applications may include any of various application programs implementing computer-based communications techniques such as email, instant messaging, IP telephone, file transfer protocol (FTP), and so forth. For a communications application to be fully utilized in the CAT methods described herein, the application should be CAT-enabled. As noted above, this means that the application must be adapted to interact with the CAT program. For example, the application may be adapted to accept a user's username (identifier) and/or password from the CAT program. As another example, an application may pass a list of participants in an ongoing communications session to the CAT program, so that the CAT program can attempt to obtain full identifier sets for the participants (in case communication using a different application is later required). A CAT-enabled application may be designed as such by its original author. For example, the CAT program and CAT-enabled application could be originally written using a common application programming interface (API). Alternatively, a CAT-enabled application may be created by modification of a previously-written application program to allow it to interact with the CAT program, if the API of the application program is known. As another alternative, a shell, or wrapper, program which acts as an interface between an application program and the CAT program could be used. Even a non-CAT-enabled application program can be launched by the CAT program, however, if the user is willing to provide appropriate identifier and password information. This situation is discussed further in the description of FIG. 8 below.

In the embodiment of FIG. 1, storage medium 20 on server 10 includes a server version 28 of the CAT program. Server CAT program 28 is adapted to manage identifier and availability information for multiple participants in communications sessions. In an embodiment, server 10 may be a server used as a kind of network "meeting place," perhaps housing an online auction service or discussion forum. In this case, CAT program 28 could obtain identifier and availability information of the participants, and provide it to those who may wish to communicate directly with one another. Server CAT program 28 is adapted to interact with local CAT programs 22 of communication session participants, in order to exchange participant identifier and availability information. The multiple identifier sets which may be obtained by CAT program 28 may be stored in data structure 30. Availability information for each participant may be stored in structure 30 as well.

Display screens 30 are shown coupled to each of computers 12a and 12b. These screens may be used to view information displayed by a CAT program or communication application program. It is noted that the particular division of responsibility between CAT program 22 and a CAT-enabled communications application may depend on the particular configuration. Data may be channeled from the CAT program through a communications application program, for example, or vice versa. Functions of one of these programs described herein may therefore also be implementable through the other program, or through various combinations of the two. In FIG. 1 and any other block diagrams appearing herein, the blocks are intended to represent functionality rather than specific structure. Implementation of the represented system using circuitry and/or software could involve combination of multiple blocks into a single circuit or device, or combination of multiple circuits and/or devices to realize the function of a block. Furthermore, the system may include other elements not explicitly shown. For example, computers are typically associated with at least one input device such as a keyboard and/or pointing device (e.g., a mouse), and at least one output device such as a display or printer. Many other elements, such as display controllers, may be present though not shown in FIG. 1.

Figure 2:
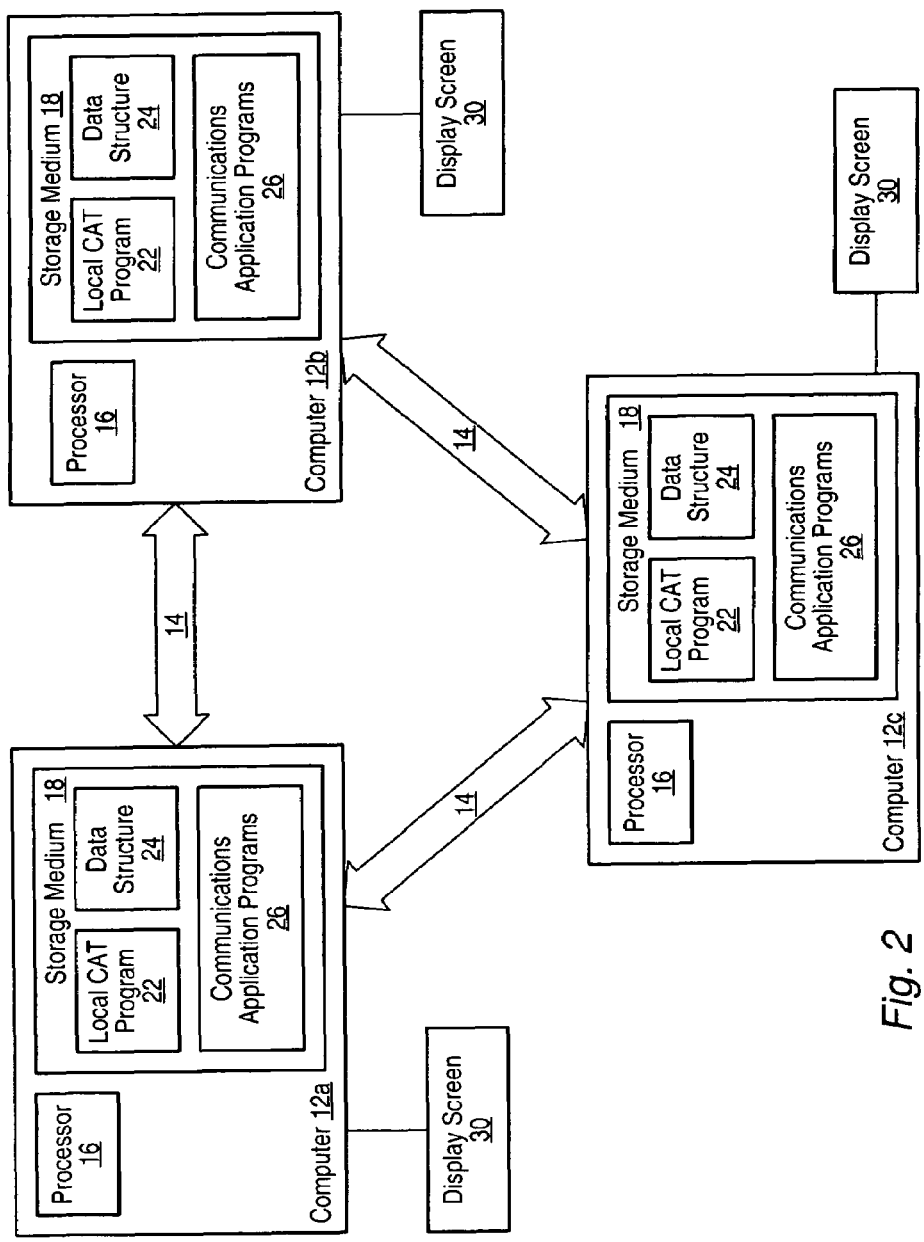
FIG. 2 is a block diagram illustrating an embodiment of a system for computer-based communication using a peer-to-peer architecture.

An alternative embodiment of a system for computer-based communications is shown in FIG. 2. In the embodiment of FIG. 2, no server is used, and computers 12a, 12b and 12c are each used by a potential participant in a communications session. The elements shown within the computers of FIG. 2 are similar to those described for computers 12a and 12b of FIG. 1. Local CAT program 22 and/or communications applications 26 may operate somewhat differently in the peer-to-peer mode of FIG. 2, however. In the absence of a central server maintaining participant id sets for each participant, id sets may be passed from each participant to the other participants. In an embodiment, the id sets and/or availability information are passed through the communications application programs running on each computer. This may be convenient in that these programs must have a connection established in any case if they are involved in a communications session. Information passed to an application program could then be sent to the local CAT program. Alternatively, the id sets and availability information could also be passed over connections between the local CAT programs on the various participant computers. In an embodiment, the management of identifiers and availability information during the communications session is handled by the local CAT program of the computer which initiated the communications session.

Exemplary content of a data structure such as data structure 24 of FIGS. 1 and 2 is shown in FIG. 3. The data of FIG. 3 is shown in terms of attributes that may be associated with an object in an object-based programming approach, and values of those attributes. The data structures and programs described herein are not necessarily implemented using an object-based approach, however. Attributes included in FIG. 3 include name attribute 32, email attribute 34, and email availability attribute 36. Such data could of course be organized differently than shown in FIG. 3. For example, the username and domain name of the email address could be separate attributes. The value of the name attribute may in some object-based embodiments be used as an object handle, or name to reference the object. Such an object handle could naturally be some other name rather than the participant's whole name. Attributes 38 and 40 refer to a user's identifier and availability for an instant messaging application. Similar attributes could of course be included for many other communications applications. Attributes 42 and 44 refer to a permission level and role of the user. The particular values assigned are dependent on the particular implementation, and need not be numerical values. Permission and role are typically assigned with respect to an organization or group. In an embodiment, a data structure could include multiple permission and/or role attributes, each for a different group or organization to which the participant belongs. Separate role or permission attributes may also be appropriate for different communications applications in some embodiments. Passwords for use with the various communications applications may also be included as attributes in FIG. 3, in embodiments for which a user desires to have passwords stored by a CAT program.

The information included in FIG. 3 is subject to change over time, particularly the availability information. The information may therefore be periodically updated by the CAT program. A local CAT program may update information relating to the local computer and user, and the updated information may be sent to a server CAT program (or local CAT program, in a peer-to-peer implementation), either automatically or upon request. As noted above, information such as that in FIG. 3 may be configured in numerous ways. For example, all information relating to one participant could be within a single object, or some of it, such as availability information, could be within a separate object. In addition to the information shown for one participant, similar information for other participants may be stored in a data structure as well. In an embodiment, information for each participant is within its own object.

Figure 4:
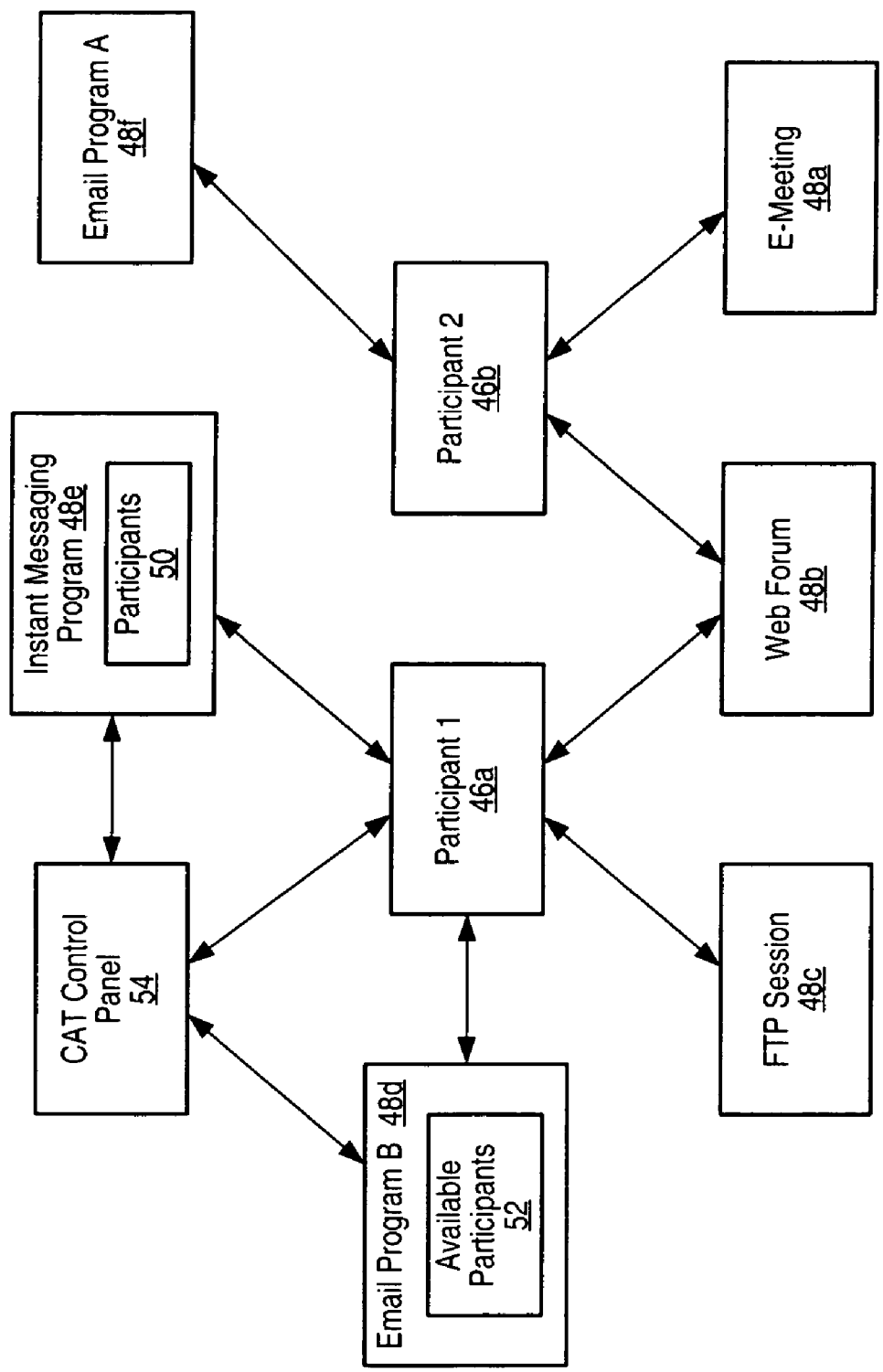
FIG. 4 illustrates exemplary object interactions in an object-based implementation of the communications aggregation technique described herein.

An illustration of some possible object interactions associated with an exemplary object-based implementation of the CAT technique described herein are shown in FIG. 4. The arrangement of FIG. 4 is not an exhaustive map, and is intended only to give an idea of the types of objects that could be used. Participant objects 46a and 46b may include collections of data similar to that shown in FIG. 3, such as identifier sets and availability information. Multiple communications application programs may be represented by objects, as shown by objects 48a through 48f in FIG. 4. Associated with a communications application could also be a sub-object including a list of participants in a current communications session, such as participant object 50 within instant messaging object 48e. For some applications not currently involved in a communications session, a set of participants who would be available for communication with that application may be determined. This type of available participant list may be obtained by a CAT program in preparation for a possible change of communications application during a session. Such a set is represented by available participants object 52 within email program B object 48d. Object 54 represents a CAT console, or control panel through which communications sessions may be initiated or changed. The arrows in FIG. 4 show possible object interactions, but do not represent the only interactions possible.

Figure 6A:
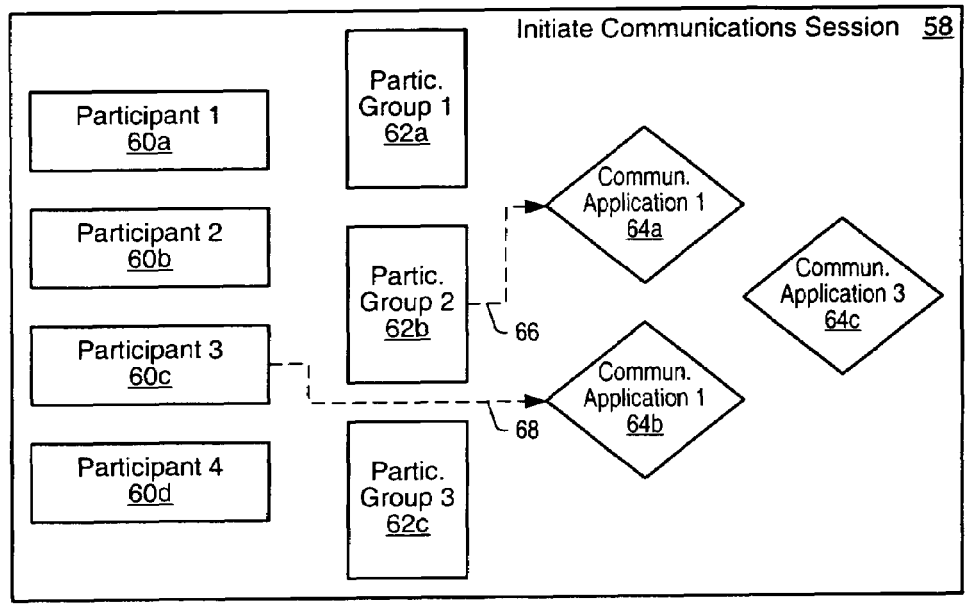
FIG. 6a illustrates an exemplary GUI through which a communications session may be initiated.
Figure 6B:
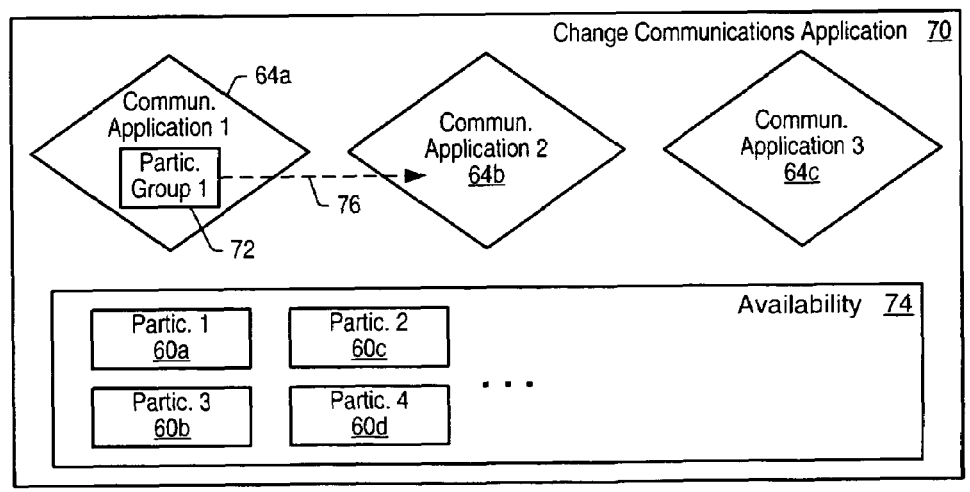
FIG. 6b illustrates an exemplary GUI through which the communications application used in a session may be changed.
Figure 7:
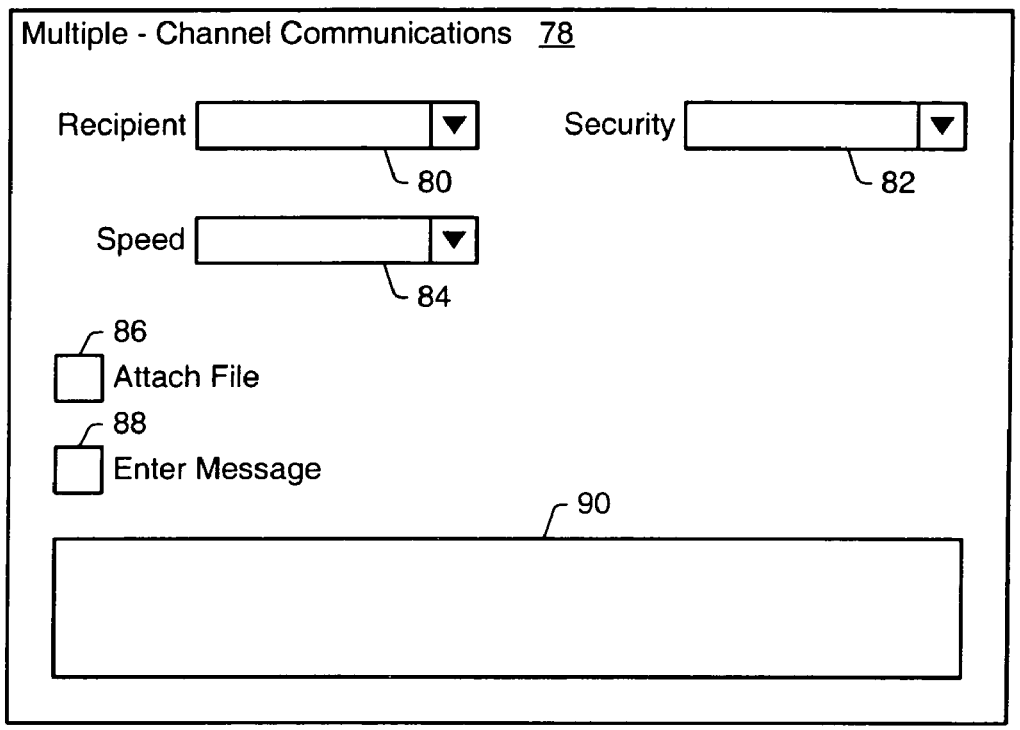
FIG. 7 illustrates an exemplary GUI which may be used to initiate sending of a message using communications methods selected by a CAT program.

Examples of information which may be displayed by a CAT program on a user's display screen are shown in FIGS. 5-7. These displays may be associated with a CAT console which is available to a user when the local CAT program is running. Window 56 of FIG. 5 includes a display of active conversations involving a user. In the embodiment of FIG. 5, the name of the application, status, and user identifier are shown. Other windows similar to window 56 could include other types of information. For example, a window could show all communications applications installed on a given computer, having status indicators including "running," "inactive," "available," "not available," etc. as appropriate, with corresponding user identifiers if they exist. Another window could provide status of all of the communications ports or channels on the computer, including whether there is an active communication, and if so, what application is being used. In some embodiments, such information on communications ports could be obtained through use of a "netstat" command in DOS or unix operating systems (or similar commands in other operating systems). Easy access to status of communications channels, as may be offered through such an embodiment of the CAT console, may be important for maintaining computer security, since one method of "invading" a computer for illegal purposes involves secretly installing "robot" or "zombie" programs onto the computer. Such robots often communicate using Internet Relay Chat (IRC) channels.

Exemplary GUI screens which may be used to initiate or change a communications session are shown in FIG. 6. In the embodiment of FIG. 6a, window 58 includes participant icons 60a through 60d, participant group icons 62a through 62c, and communications application icons 64a through 64c. The participant and participant group icons are preferably labeled with some name that identifies them to the user. Selection of a participant icon or participant group icon and movement of the icon to the position of one of the communications application icons is illustrated by arrows 66 and 68. This "drag and drop" motion may be performed using a pointing device such as a mouse connected to the computer, where the lateral position of the pointing device corresponds to that of a pointer displayed on the screen (not shown).

The selection and movement represented by arrow 66 in FIG. 6a constitutes a notification to the CAT program that a communications session with participant group 2 using communications application 1 is desired. Stored participant identifiers for the desired participants may then be retrieved in order to start the communications session. The participant identifiers may in some cases be retrieved from a local data structure, particularly if the identifiers were retained after a previous communication session. Alternatively, the identifiers may be requested from a server CAT program or local CAT programs of other computers, depending on the configuration of the CAT network. Even in cases for which participant identifiers are available locally, identifiers and/or availability information may be obtained from another CAT program in order to ensure updated information. In an embodiment, identifier and/or availability information can be accessed by a user of the GUI. This could be implemented, for example, through a pop-up menu appearing when the pointer is positioned over a participant icon or participant group icon (in some embodiments, a "click" of a mouse could be used to summon such a menu). Access to this information could help a user decide which communications application to choose for the communications session.

In the embodiment of FIG. 6b, window 70 includes communications application icons 64a through 64c, similar to those shown in FIG. 6a. Within (or superimposed upon) icon 64a of FIG. 6b, however, is participant group icon 72. Icon 72 represents a group of participants in a current communications session using communication application 1 (represented by icon 64a). If during this communications session it is decided to change the communications application being used from communications application 1 to communications application 2, then participant group icon 72 may be dragged and dropped from icon 64a to icon 64b, as illustrated by arrow 76. In the embodiment of FIG. 6b, availability information is accessible by the user using availability box 74. Box 74 includes icons for each participant in the participant group, and selection of an icon brings up availability information for the corresponding participant. The GUIs shown in FIG. 6, as well as any other GUIs shown herein, are merely exemplary embodiments, and many variations are possible and contemplated. Details such as the particular icon shapes and sizes, for example, are not important to the implementation of the methods described herein. Other presentation schemes may be suitable in other embodiments, as well. For example, the availability information in box 74 of FIG. 6b could be directly presented in tabular form, rather than accessed through participant icons. Furthermore, changing of a communications application through icon selection and movement could be done in other ways than that shown. For example, the combination of icons 64a and 72 in FIG. 6b could be moved, rather than just icon 72.

The GUI's discussed in FIG. 6 above may be used by a user to configure a communications session in which the user chooses the communications method to be used. A different approach is illustrated by the GUI window shown in FIG. 7. Window 78 shown in FIG. 7 allows a user to initiate sending of a message, but the communications application, or applications, to be used is chosen not by the user but by the CAT program. Entry boxes 80, 82 and 84 allow user entry of the desired recipient, security level, and transmission speed, respectively. In this embodiment, entry could be done in some cases by typing into the box, or alternately by selecting from a menu accessed using the arrow button to the right of each box. The security level and speed entries may be relative values, such as "high," "medium," or "low". Check boxes 86 and 88 allow the user to signal intent to attach a file for transmission or to enter a particular message into box 90, or both. The CAT program may then use the information entered into window 78, as well as other information (such as availability of the recipient) to determine one or more communication methods to use in sending the message. In a "scatter-gather" mode of communication, the message could be divided, sent using multiple methods, then reassembled by the CAT program at the recipient's end. Such an approach may provide the most efficient utilization of the communications applications available. It is not necessary for either the sender or the recipient to know which methods are used. The GUI shown in FIG. 7 is only exemplary, and could be altered in many ways. For example, other user-entered criteria could be included, such as cost or bandwidth usage. All of the GUIs described herein illustrate only exemplary way of interaction with a CAT program. Other interfaces, such as a command interface, could also be used.

Figure 8:
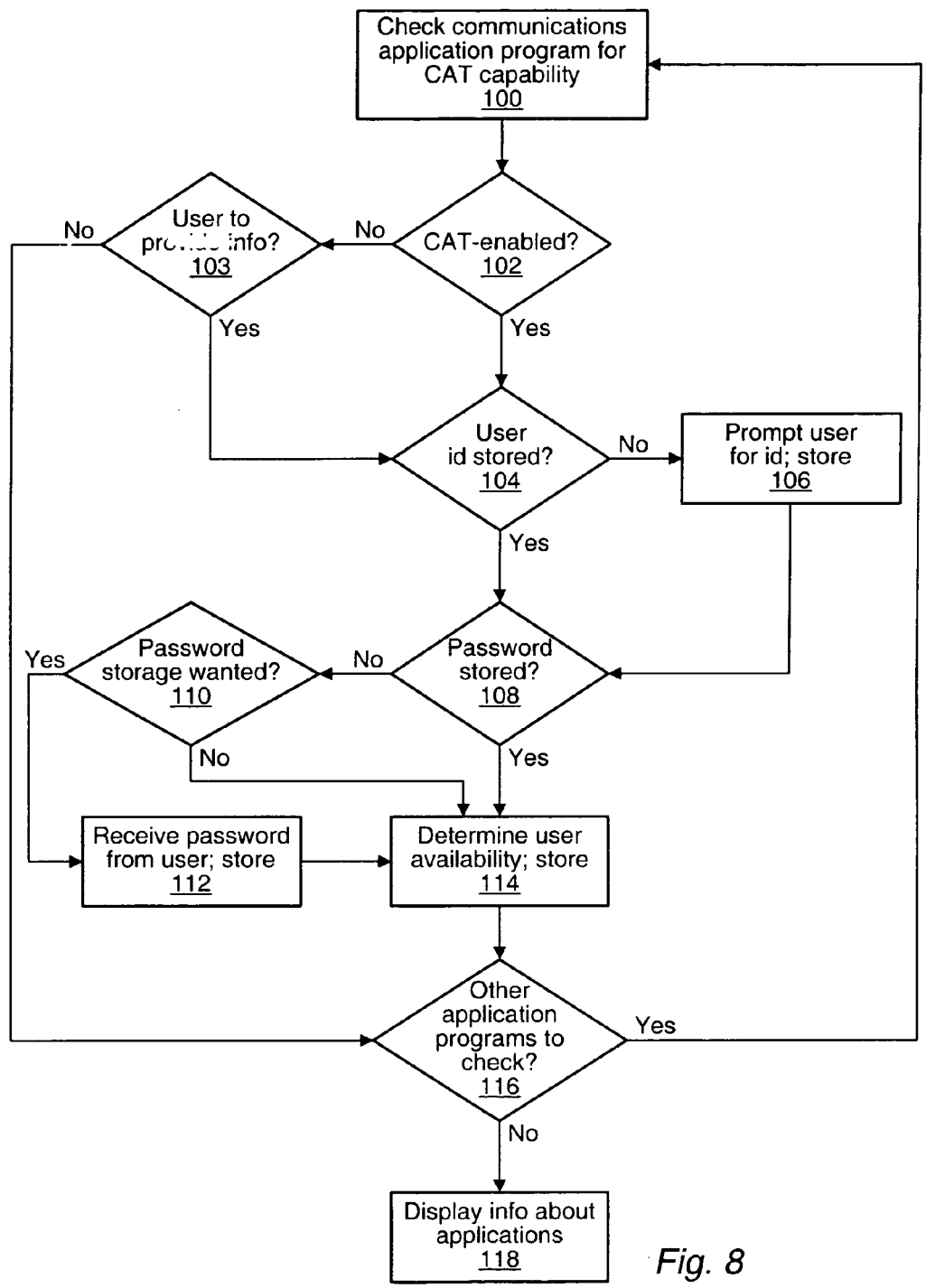
FIG. 8 is a flow diagram illustrating an embodiment of a method for configuring computer-based communications.

A flow diagram of an exemplary embodiment of a method for configuring computer-based communications is shown in FIG. 8. The procedure of FIG. 8 may be performed by a CAT program such as local CAT program 22 in FIGS. 1 and 2, typically upon startup of the computer or startup of the CAT program. In the embodiment of FIG. 8, the communications application programs associated with the computer are checked for CAT compatibility (box 100). Ways in which the application programs could be checked for CAT compatibility include looking for certain files associated with CAT-enablement of the application, or sending an appropriate query to the application program, if it is running. If a checked program is not CAT-enabled, a CAT program may still be able to launch the application. If the user agrees to provide the appropriate identifier and password ("yes" branch of decision box 103), this information may be obtained through the same procedure used for CAT-enabled programs, beginning with box 104. If the application is CAT-enabled and the user identifier for the application is not stored ("no" branch of decision box 104), the user is prompted for the identifier and the identifier is stored (box 106). In the case of a CAT-enabled application, this situation could arise during initial set up of the CAT program. Once the identifier is stored, if the corresponding password is not stored ("no" branch of decision box 108), the user is asked whether password storage is desired. If the user wishes to store a password ("yes" branch of decision box 110), the password is received from the user and stored (box 112).

It is noted that embodiments of the methods described herein may provide user control over security at many levels. In addition to allowing a user to choose whether to allow password storage, the method could in some embodiments allow the user to choose whether to allow identifier storage. In a further embodiment, the user could have a choice as to whether storage of an identifier and/or password is to be maintained only for the current session, or if the information may be retained after the session ends, for use in future sessions. Even if passwords are stored, they are preferably retained on the local computer, and not sent to a server computer or other participant's computer. Depending on the particular security concerns of the user, storage of passwords and/or identifiers even on the local computer may be refused. Because any identifiers or passwords not stored will need to be provided by the user at the time an application is launched, there is a tradeoff between security and convenience. Allowing user choice with respect to the storage of identifiers and passwords for each separate application program may give the flexibility needed for a user to come up with the appropriate balance of security and convenience for a given situation.

Continuing with the embodiment of FIG. 8, user availability using the communications application in question is then determined and stored (box 114). In assessing availability, things which may be considered include whether the user is logged onto the computer, whether the communications application is running, whether needed hardware (such as camera or microphone) is connected, and so forth. In some embodiments, the assessment may be made by a CAT-enabled application, with a result given to the CAT program. The above-described procedure is repeated for any other communications applications to be checked. When there are no more application programs to process, information regarding the applications is written to the display screen of the computer (box 118). This display may be of a form similar to that shown in FIG. 5, or those described in the discussion of FIG. 5 above. Variations of the method of FIG. 8 are possible and contemplated. For example, identifiers, passwords and availability information may not all be obtained during a single setup procedure as shown. Updating of availability information could be done during a separate procedure, for instance.

Figure 9:
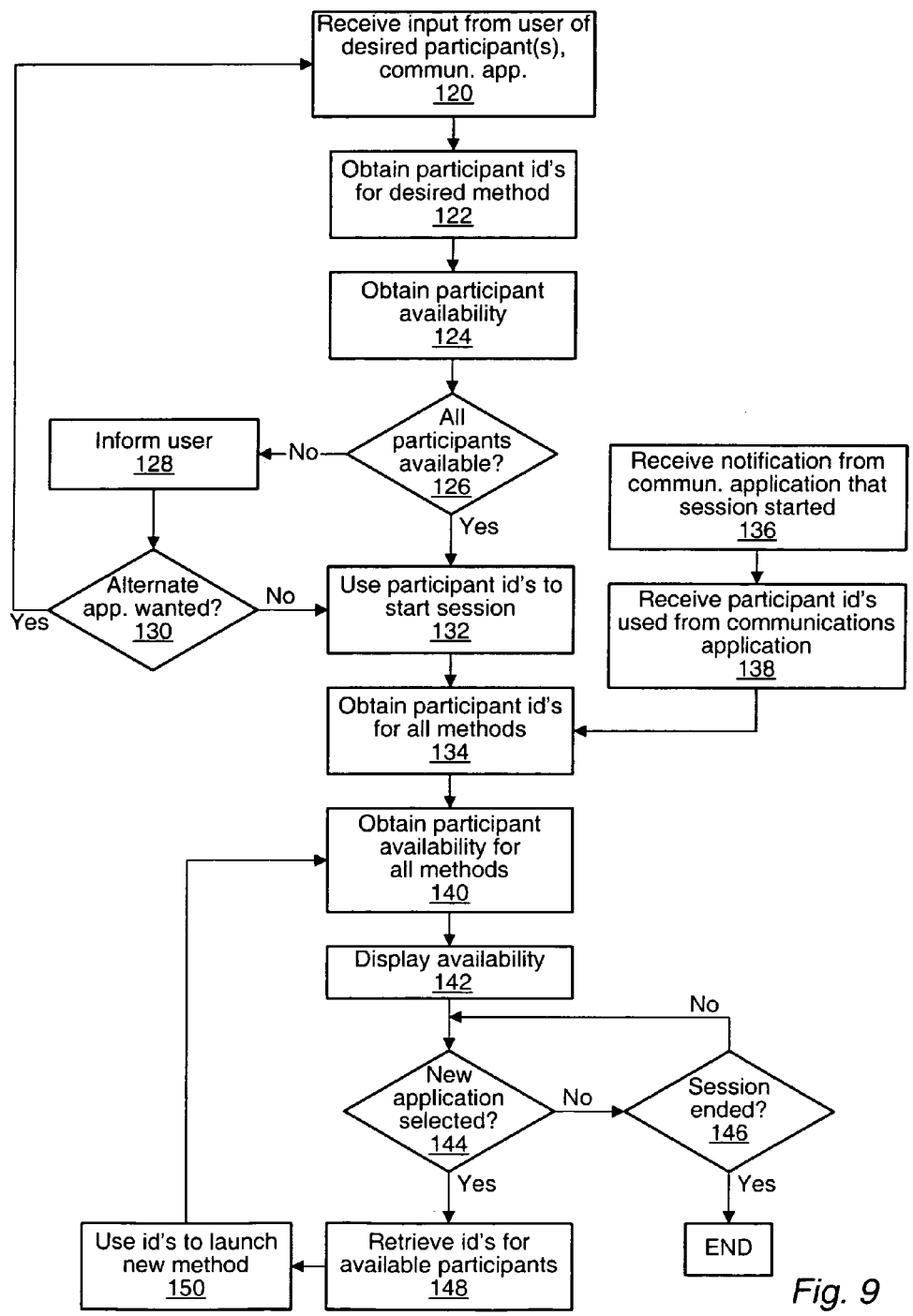
FIG. 9 is a flow diagram illustrating an embodiment of a method for changing the communications application used during a communications session.

A flow diagram of an embodiment of a method for changing the communications application used during a communications session is shown in FIG. 9. The embodiment of FIG. 9 includes two alternative branches relating to initial establishment of a communications session. Boxes 120 through 132 describe establishment of the session using the CAT program, while boxes 136 and 138 are for a case in which the initial communications session may be established independently of the CAT program. The method of FIG. 9 may be implemented using a CAT program such as program 22 or 28 of FIG. 1, or may in some embodiments be implemented through a combination of a CAT program and a CAT-enabled communication application program. In a case for which the CAT program is involved in establishing the initial communications session, input is received from the user of one or more desired participants, and of a desired communications application for the session (box 120). The user may provide this input by manipulation of icons, as described above in the discussion of FIG. 6a, or in other ways such as through a command-based interface.

Identifiers appropriate to identify the desired participants to the desired communications application are then obtained (box 122), as well as information on the availability of each participant for communication using the desired application (box 124). Depending on the network architecture used, the identifiers and availability information may be obtained by a server CAT program from various local CAT programs on other computers, then passed to the local CAT program on the computer initiating the communications session. Alternatively, the information may be passed from one local CAT program to another, possibly through a CAT-enabled communications application program. As a further alternative, the information could already be stored locally, perhaps as a result of a recent previous communications session. If any of the participants is not available using the communications method ("no" branch of decision box 126), the user may be informed (box 128) and asked whether an alternate communications application is preferred (box 130). If the participants are all available, or if the user wishes to continue in any case, the participant identifiers are used to start the communications session (box 132).

As an alternative to the above-described procedure, notification may be received from a communications application that a session has been started using that application (box 136). A list of the participant identifiers being used in that session may be received (box 138). Once the identifiers from the initial session are received, whether through the sequence ending in box 132 or that ending in box 138, the identifier sets of the participants for other communication applications may then be obtained or updated (box 134). In the embodiment of FIG. 9, availability information for the participants with respect to all of the communication applications is then obtained or updated (box 140). The availability information may then be displayed on the display screens of one or more of the participants in the communications session (box 142). This display of availability information may in some cases be in a form similar to that described in the discussion of FIGS. 6a and 6b above. If a new application is selected by one of the participants ("yes" branch of decision box 144) before the communications session ends, identifiers for those participants who are available may be retrieved and used to launch the new communications method (boxes 148 and 150). Selection of a new application could be done in a manner similar to that shown in FIG. 6b, or through some other method, such as entry of commands. In some embodiments, the ability to change the communication method used may be limited in some way, such as being limited to the user who initiated the communications session. Upon starting the new communications application, the availability information could be updated and displayed (boxes 140 and 142) in preparation for a possible additional change of application program.

The capability of launching additional communications sessions, illustrated by the method of FIG. 9, may also be used in a method of connecting two sessions together, or "jumpering" the sessions. The jumpering involves copying messages received using one communications application to another. An incoming email message could therefore be viewed as an instant messaging message in one embodiment. The jumpered sessions could both use the same type of communications application in some cases, such as when a message from one email account is copied to the screen of another email account. Return messages would be copied in the same way, so that each participant in a conversation would be interacting with only one communications application. Jumpering may be desirable, for example, in situations where certain applications are easier to access than others, or when one form of communications is more convenient than the form originally used for a communications session. One participant in a session can use the communications application of his choice through jumpering, without the other participant even knowing that a different application is being used on the other end, so that the other participant doesn't have to do anything differently.

The flow diagram of FIG. 9, as well as all flow diagrams included herein, is merely exemplary, and could be varied in many ways. For example, the methods described herein may not involve obtaining availability information in every case, so that steps such as 124-130, 140, 142 and 148 in FIG. 9 may be omitted. Some of the steps could also be done in reverse order or simultaneously, such as steps 122 and 124, and steps 136 and 138. In the method of FIG. 9 and all methods described herein, availability and/or identifier information may be updated more or less often than shown in this example. The update frequency may in some embodiments be set by a user of the CAT program.

Figure 10:
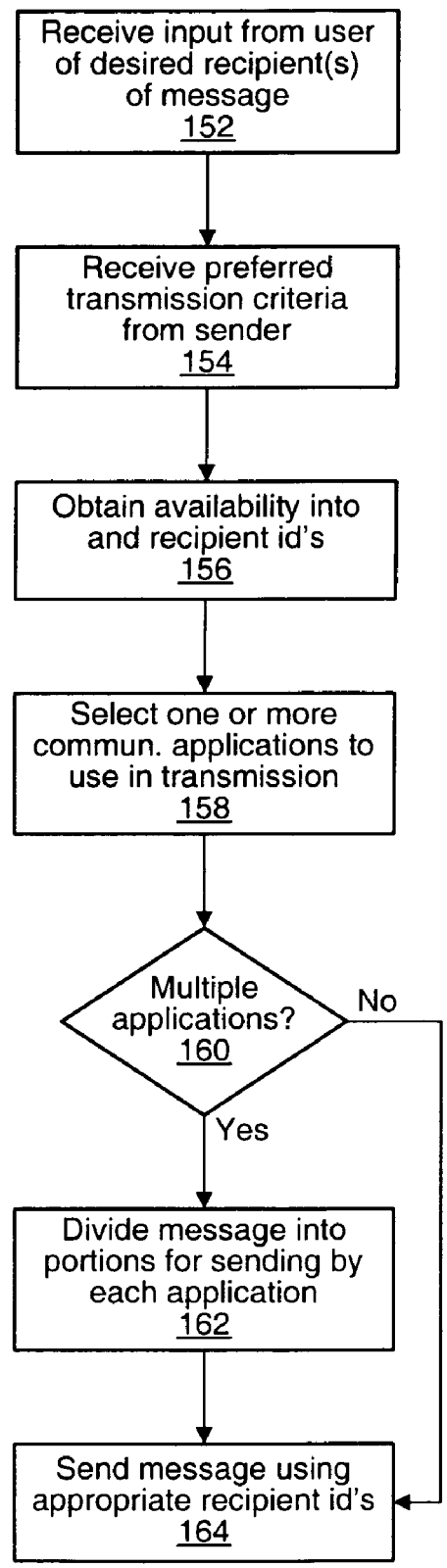
FIG. 10 is a flow diagram illustrating an embodiment of a method for sending a message using communications applications selected by the CAT program.

A flow diagram of an embodiment of a method for sending a message using communications applications selected by the CAT program, rather than by the sender, is shown in FIG. 10. In the embodiment of FIG. 10, notification is received from the sender of the message of one or more desired message recipients (box 152). Preferred criteria for the transmission may also be received from the sender (box 154). The sender may in some embodiments provide such information through a GUI similar to that of FIG. 7. Recipient identifiers and availability information for the possible communication applications may then be obtained (box 156). This information may already be stored locally, particularly if the sender and recipient are in an existing communications session. Alternatively, the information may be obtained or updated from CAT programs on a server computer or on other client computers, depending on the network configuration, and as described above with respect to the methods of FIGS. 8 and 9. Based on factors including the criteria provided by the sender and the availability information for the recipient, one or more communications applications to use for the message transmission are selected (box 158). If multiple communications applications have been selected, the message is divided into portions to be sent by each application (162). In a message with multiple separate components, for example, a small attachment may be sent using one method, a large attachment using another, and a text message sent with a third application program. The message is then sent to the recipient using the appropriate identifiers for the selected communications applications (box 164).

It will be appreciated by those skilled in the art having the benefit of this disclosure that this invention is believed to provide a system, method and program for aggregating multiple computer-based communications applications. Furthermore, it is also to be understood that the form of the invention shown and described is to be taken as exemplary, presently preferred embodiments. Various modifications and changes may be made without departing from the spirit and scope of the invention as set forth in the claims. For example, the system and methods described herein may be implemented using many combinations of hardware and/or software, and at one or more of many different levels of hardware and/or software, as is the case with many computer-related applications. It is intended that the following claims be interpreted to embrace all such modifications and changes.

What is claimed is:

1. A method of establishing a computer-based communication session involving a user of a computer, said method comprising:
    receiving, from the user, notification of a desired participant in the communication session and a desired communications application to be used for the session, wherein the desired communications application is selected from multiple communications applications available for use in the session, wherein said receiving comprises:
        detecting selection of a first displayed icon within a graphical user interface (GUI) displayed using the computer; and
        detecting movement of the first icon to the position of a second displayed icon within the GUI, wherein one of the first and second icons represents the desired participant and the other represents the desired communications application;
    retrieving a participant identifier effective to identify the desired participant to the desired communications application; and
    providing the retrieved participant identifier to the communications application.

2. The method as recited in claim 1, wherein one of the first and second icons instead represents a previously-established communications session with the desired participant using a different communications application, and the other represents the desired communications application.

3. The method as recited in claim 1, wherein one of the first and second icons instead represents a group of desired participants and the other represents the desired communications application.

4. The method as recited in claim 1, wherein said retrieving comprises accessing a data structure storing the participant identifier.

5. The method as recited in claim 4, wherein said receiving comprises receiving required participant permission or role information, and wherein said retrieving further comprises verifying participant or role information stored in the data structure.

6. The method as recited in claim 1, further comprising displaying, on a display screen of the computer, a graphical user interface including representations of multiple communications applications accessible with the computer and representations of multiple potential participants in a communications session.

7. The method as recited in claim 6, wherein said representations of multiple communications applications and said representations of multiple potential participants comprise respective icons.

8. The method as recited in claim 1, further comprising retrieving a user identifier appropriate to identify the user to the desired communications application.

9. The method as recited in claim 8, further comprising retrieving a password effective to allow access of the user to the desired communications application.

10. A system for computer-based communications, comprising:
    means for displaying, on a display screen of the computer, a graphical user interface including representations of multiple communications applications accessible using the computer and of multiple potential participants in a communications session, wherein said representations comprise icons;
    means for receiving, from a user of a computer, notification of a desired participant in a communications session and a desired communications application for use in the communications session, wherein the desired communications application is selected from the multiple communications applications accessible using the computer, and wherein said notification comprises detecting a combined selection of a first icon representing the desired communications application and a second icon representing the desired participant;

means for retrieving a participant identifier appropriate to identify the desired participant to the desired communications application; and means for providing the retrieved participant identifier to the communications application.

11. The system as recited in claim 10, wherein said means for displaying, means for receiving, means for retrieving and means for providing comprise a communications aggregation program stored on a storage medium within the system.

12. The system as recited in claim 11, wherein the storage medium is within or accessible by the computer.

13. The system as recited in claim 11, wherein the storage medium is within or accessible by an additional computer.

14. The system as recited in claim 11, wherein the communications aggregation program is adapted to access a data structure including the participant identifier.

15. The system as recited in claim 14, wherein the data structure is stored on or accessible by an additional computer.

16. The system as recited in claim 10, further comprising means for retrieving a user identifier appropriate to identify the user to the desired communications application.

* * * * *